United States Patent [19]

Garr

[11] Patent Number: 4,888,905
[45] Date of Patent: Dec. 26, 1989

[54] ENHANCED LIGHT FISHING LURE

[76] Inventor: Michael M. Garr, 1 Ziska Ave., Jericho, N.Y. 11753

[21] Appl. No.: 107,846

[22] Filed: Oct. 6, 1987

Related U.S. Application Data

[63] Continuation of Ser. No. 848,697, Apr. 4, 1986, abandoned, Continuation-in-part of Ser. No. 910,310, Sep. 22, 1986, Pat. No. 4,727,674, Continuation of Ser. No. 661,162, Oct. 15, 1984, abandoned.

[51] Int. Cl.$^4$ .............................................. A01K 85/00
[52] U.S. Cl. .................... 43/17.6; 43/42.06; 43/42.34; 43/42.35
[58] Field of Search ............... 43/17.6, 42.06, 42.33, 43/42.34, 42.35

[56] References Cited

U.S. PATENT DOCUMENTS

| | | | |
|---|---|---|---|
| 2,237,534 | 4/1941 | Van der Clute | 43/17.6 X |
| 2,241,941 | 5/1941 | Bates | 43/42.33 |
| 2,599,035 | 6/1952 | Wing | 43/42.33 |
| 3,608,228 | 9/1971 | Borreseu et al. | 43/17.6 |
| 3,621,600 | 11/1971 | Dworski | 43/17.6 |
| 3,721,033 | 3/1973 | Haynes | 43/17.6 |
| 3,969,839 | 7/1976 | Ziegler | 43/17.6 |
| 4,175,348 | 11/1979 | Ray | 43/17.6 |
| 4,250,651 | 2/1981 | Ramme | 43/17.6 |
| 4,638,584 | 1/1987 | Lindsay | 43/17.6 |
| 4,693,032 | 9/1987 | Mattison | 43/17.6 |
| 4,727,674 | 3/1988 | Garr | 43/17.6 |

FOREIGN PATENT DOCUMENTS 2535433  2/1977  Fed. Rep. of Germany ....... 43/17.6

Primary Examiner—Richard K. Seidel
Assistant Examiner—Carmine Cuda
Attorney, Agent, or Firm—Handal & Morofsky

[57] ABSTRACT

A fishing lure comprising one or more internal light sources has a body made of a single fiber optic which may be smooth, multifacetted or contain molded in cabochon shapes. The body also contains a power source and associated circuitry for controlling the light source. The fiber optic body has connecting sections which allows access to the light sources, power source, and portions of the circuitry and permits replacement of the power source.

15 Claims, 3 Drawing Sheets

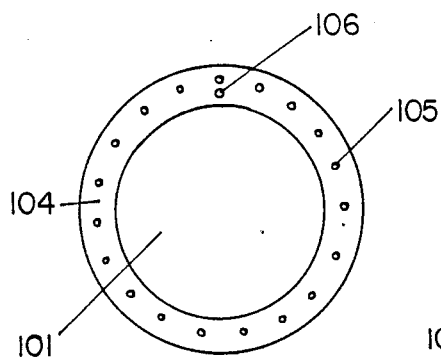
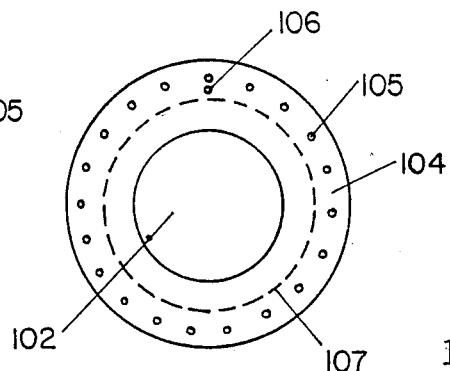
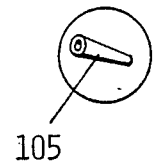
FIGURE 4      FIGURE 5      FIGURE 6
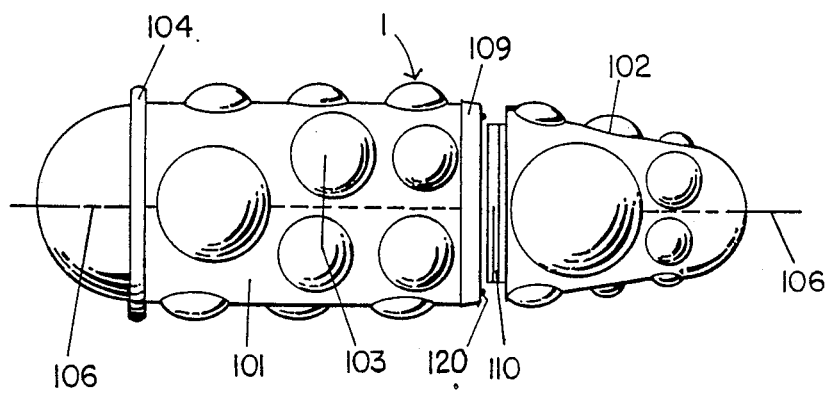
FIGURE 7
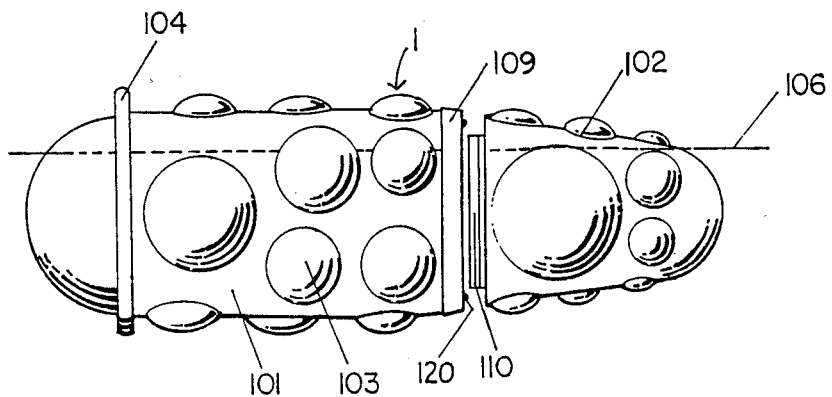
FIGURE 8

ENHANCED LIGHT FISHING LURE

CROSS REFERENCE TO RELATED APPLICATIONS

This application is a continuation of U.S. patent application Ser. No. 848,697, filed Apr. 4, 1986, now abandoned and a continuation-in-part of U.S. patent application Ser. No. 910,310, filed Sept. 22, 1986, now U.S. Pat. No. 4,727,674, entitled "Electronically Lighted Fishing Lure," which is a continuation of U.S. patent application Ser. No. 661,162, filed Oct. 15, 1984, now abandoned.

PRIOR ART

1. Field of the Invention

This invention relates to fishing lures and more particularly to lighted fishing lures using solid state electronic components and fiber optic enhancement.

2. Background of the Invention

In order for an illuminated fishing lure to be useful to either the sport or commercial fisherman a number of criteria must be met; some of which are mandated by the physiology of the fish, and others by the physical and financial needs of the fisherman. Foremost, the light must be introduced into the fish's environment in a manner most likely to attract the fish. Concurrently, the lure must also satisfy the fisherman's need for a durable and inexpensive lure. Additionally the lure must be light and small enough for the fisherman, particularly the sport fisherman to use with his customary tackle.

Both scientist and fishermen are uncertain of the specific reasons light attracts fish. Many postulate that light mimics the luminescence that some fish prey and fish roe exhibit naturally. Light has been used as an attractant since prehistoric times in native fishing techniques which in the main have been successful.

In recent years much research has been undertaken to ascertain the role of light and vision in the functional life of fish. In particular much attention has been directed to learning which behaviours are light controlled since with this knowledge fishing strategies can be devised which are more likely to be successful. Blaxter (J. H. S. Blaxter "Fish Vision and Applied Research" and "Absolute Thresholds") has demonstrated two interrelated light dependent functions. Many fish feed by sight and the amount of feeding activity is proportional to the amount of light available. Feeding is usually combined with the light dependent behavior of vertical migration. He found that light becomes a controlling factor when its intensity exceeds $10^{-1}$ m.c. (millecandela). Below this level light cannot attract fish to feed, or to migrate, or to school.

Significant scientific research in the past few decades has provided much information about how the light should be introduced to the fish's enviroment in order to successfully attract the fish to strike the lure. Muntz (W. R. A. Muntz "Behavioral Studies of Vision in Fish and Possible Relationships to the Enviroment") examined the response of fish to monochromatic light against a broad spectrum polychromatic background. The findings indicate several peaks of sensitivity depending on the wavelength of the monochromatic light. The highest sensitivity was at a wavelength of approximately 430 nm in the blue region. Since the conditions of this study duplicate the way in which a fish is likely to see the light given off by a lure this study indicates the light color which will attract fish and which a lure must exhibit if it is to successfully induce a fish to strike the lure.

Muntz's studies also showed that the size of the stimuli and the absolute intensity of the light stimuli were also important in gaining response by fish. Small light sources having intensities much higher than the threshold requirement were far more effective in causing response. He related that fact to the way in which the various receptors in the fish's eye function.

Volksmann (F. C. Volksmann "Behavioral Studies of Discrimination of Visual Orientation") demonstrated that light can be used to condition fish. She used Pavlovian techniques with light stimuli to cause fish to feed and perform other tasks. In her studies she found that light in order to be effective had to be of high intensity since fish accuity to light is low. Also that the same light and regularity of duration was necessary. Duration was also important since the fish had to have the light stimuli continuously to respond to it. The fish had to view the light directly in front of the eye in order to respond since apparently the fish have no appreciable peripheral vision. The light also had to cover a large arc of the fish's vision in order to be effective again because of the low accuity of the fish eye to light. (The above studies are all contained in *NATO ADVANCED INSTITUTE ON NEW APPROACHES TO THE STUDY OF VISION IN FISH* edited by M. A. Ali, Plenum Press, New York, 1974).

Thus, our knowledge of fish physiology dictates that a lighted lure in order to effectively attract fish to strike must have the following characteristics. The light must be of high intensity; it must have a high emittance in the blue range; it must be of long duration; if flashing, the sequence of flashing must have a regularity to the repeat sequence.

A number of patents relate to illuminated fishing lures. Several (Ramme U.S. Pat. No. 4,250,651 and Helling U.S. Pat. No. 4,426,803) use incandescent lamps. The filament attachment in a lamp small enough to be practicable in a fishing lure is not robust enough to withstand the rough handling to which a lure is routinely subjected. A lure is repeatedly cast, or trolled in rough seas, definitely repeatedly struck by fish, and also must be able to withstand being untangled from all manner of debris in the water.

Several patents which relate to illuminated lures use LED's (light emitting diodes) as their light source. Northcutt (U.S. Pat. No. 3,940,868), Ursey et at. (U.S. Pat. No. 4,227,331), and Helling (U.S. Pat. No. 4,426,803) use externally mounted LED's. Helling and Northcutt both mount their LED's either on or in very close proximity to the hooks. These LED's are particularly vulnerable when a fish strikes. Care must be taken when handling the lure in order to preserve the LED. Externally mounted LED's are easily destroyed when subjected to the routine rough handling given to a fishing lure.

Caviness (U.S. Pat. No. 4,536,985) discloses a flashing LED which emits in concert with the erratic motion of the lure through the water. He claims additionally benefit from the unpredictable light emission. However, current research refutes this contention.

Ray (U.S. Pat. No. 4,175,348) also discloses an intermittent flashing LED. The light emission is activated by the motion of a magnetic reed switch which shuttles between two permanent magnets. The movement of the reed switch responds to the erratic motion of the lure in the water resulting in erratic unpredictable light emission. Predictably flashing light is necessary to attract fish. This lure will be heavy in order for the lure to be made durable enough to withstand the shuttling of the reed switch between the two permanent magnets.

For a fiber optic to conduct a useable portion of the light incident on its end the light must be focused to fall at a ninety degree incident angle with the plane surface of the end of the fiber optic. If the light is not so focused by the use of mirrors or lenses the light source must be placed directly in front of the fiber optic so as to directly illuminate the entire end of the fiber. Additionally, if the fiber optic extends beyond the body of the lure it must be of large size since thin optical fibers do not have impact resistance and are more fragile than incandescent lamps filaments.

Both Fima (U.S. Pat. No. 4,347,681) and Northcutt use fiber optics. However they make no attempt to focus the light properly on the end of the fiber optics. They both use a plurality of fibers which extend outside the body of the lure. In order for these fibers to be small enough to fit practically into a lure they will also be too fragile to provide the needed durability. They also represent a method of wicking water into the electronics, and thereby causing a short circuit.

SUMMARY OF THE INVENTION

My lure comprises a single hollow fiber optic which is made in sections that can be joined. Each of these hollow sections are formed either smooth, or facetted, or with molded in cabochons shapes. Into the hollow sections are placed or molded into position the light sources, the circutry necessary to control the light sources and energy sources. The lure is made with attachments for a leader line. Depending on the intended use of the lure as either a trolling or casting lure it is fitted with attachments for down rigger lines, outrigger lines, skirts; or with a deflector.

The single fiber optic is robust enough to withstand the rough handling routinely received by lures. Since all the fragile operating parts of the lure are internal they are well protected from damage. The energy sources are replaceable when the lure is taken apart.

BRIEF DESCRIPTION OF THE DRAWINGS

FIG. 4. is a front view of the trolling lure showing the bubbler holes and the channel for the leader line.

FIG. 5 is a rear view of the trolling lure showing the bubbler holes and the channel for the leader.

FIG. 6 is a partial cross section of the collar showing a longitudinal cross section of the bubbler hole.

FIG. 7 is an external top view of the trolling lure showing the sections of the lure and the channel for the leader line.

FIG. 8 is a side view of the trolling lure showing the channel for the leader line.

FIG. 12 is a side longitudinal cross section of the casting lure showing the internal placement of the electronic components, the light source and the energy source.

FIG. 13 is a front view of the casting lure.

FIG. 14 is a rear view of the casting lure.

THE INVENTION

The body of my lure is a single fiber optic which optionally may be made in sections that are then joined in use. The body may be smooth, of multifaceted, or contain molded in cabochons. I prefer the embodiment which contains molded in cabochon shapes because the cabochons diffuse, refract, ricochet, and magnify the light in all direction of the compass. Additionally the cabochons due to their uneven surface cause turbulence and bubbling in the water. The body is made of a thermo-setting plastic which may be an acrylic, a polyester or a polycarbanate. Commercially available products such as Lexan TM manufactured by General Electric Corporation or Pet TM polyester supplied by Kodak are suitable.

Into the body of the lure are placed the source of light, the energy source which powers the source of light, and a circuit board which contains the electronic components that when energy is introduced program, drive and control the source of light. Depending on the use of the lure as either a trolling lure or a casting lure I prefer to practice my invention in a somewhat different manner. However, either preference is workable and practical in both types of lures.

Figure 1:
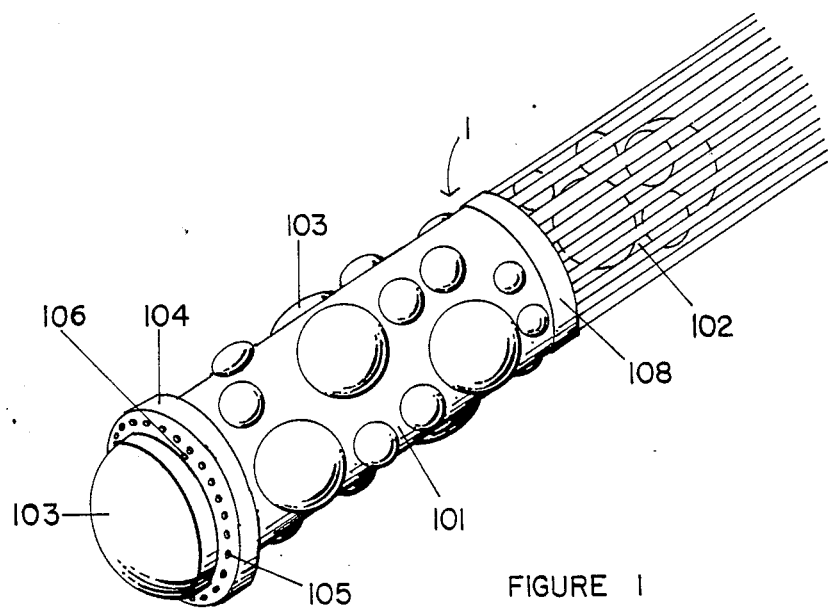
FIG. 1 is a perspective drawing of the trolling lure.
Figure 2:
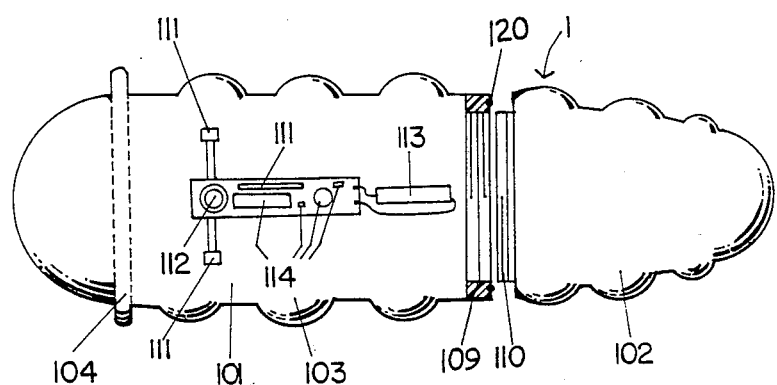
FIG. 2 is a top longitudinal cross section of the trolling lure showing; the sections of the lure, and the internal placement of the electronic components, the light source and the energy source.
Figure 3:
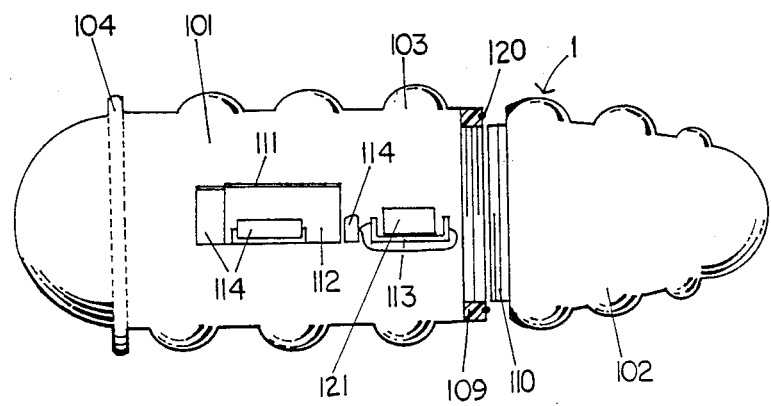
FIG. 3 is a side longitudinal cross section of the trolling lure showing the sections of the lure, and the internal placement of the electronic components, the light source, and the energy source.
Figure 9:
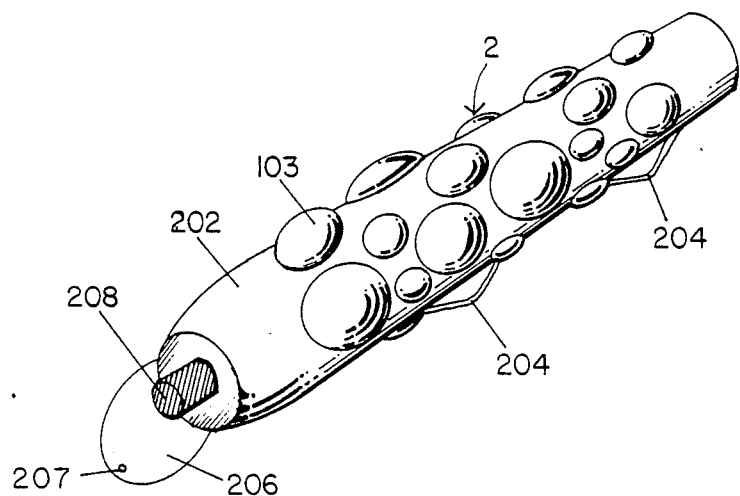
FIG. 9 is a perspective view of the casting lure.
Figure 10:
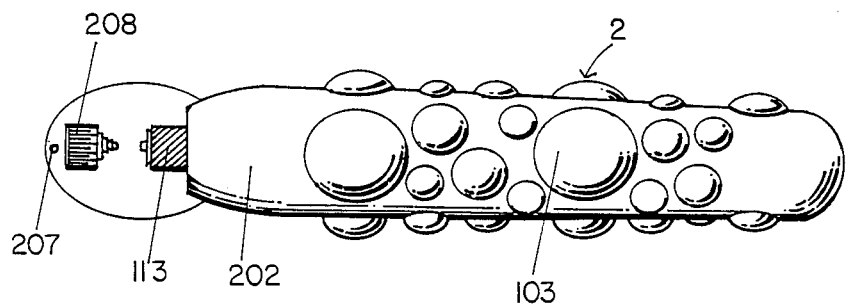
FIG. 10 is top external view of the casting lure.
Figure 11:
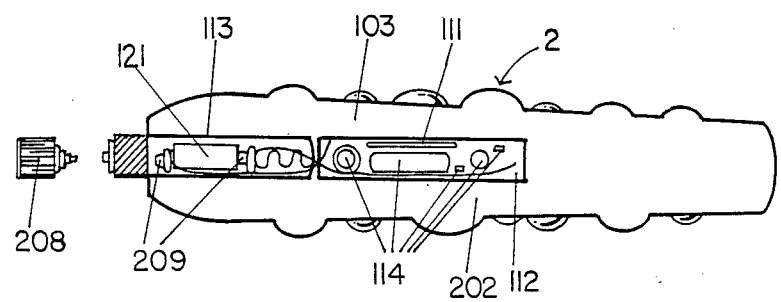
FIG. 11 is a top longitudinal cross section view of the casting lure showing the internal placement of the electronic components, the light source and the energy source.

FIG. 1–8 show my prefered embodiment for a trolling lure 1. The lure is molded in two sections; the forward section 101 has a female threaded end section 109. This forward section 101 contains molded in cabochons 103. Additionally molded in is a collar 104 which contains bubbler holes 105. The channel for the line 106 runs through both this front section 101 and the rear section 102.

This forward section 101 contains molded in attachments to receive the printed circuit board 112, which contains various electronic components 114, the battery compartment 113, and the source of light 111 which, as can be seen from FIG. 12, faces lure body 2 and is thus optically coupled thereto. The electronic components are shown merely as illustration and are not intended to accurately depict the components on the circuit board. The battery 121 is fitted into the lure just before the lure is to be used. The source of light is a a xenon flashlamp, or an LED (light emitting diode), or an array of LED's, or a combination of flashlamps and LED's. Commercially available flashlamps such as EG&G Electro-Optics Series XL,LX,DL,B,P are suitable. These lamps provide light of high intensity in the desired blue region. There are many manufacturers of suitable LED's. The printed circuit board 112 contains electronic components to control the light source and to make the voltage supplied by the battery which is placed in compartment 113 useable by the light source. The components of the circuit board will vary according to the light source selected as well as the voltage generated by the battery used. These circuits are standard in the art and are often specified by the manufacturers of the source of light. Additionally the electronic components of the printed circuit board program and control the on cycle of a single light source. When an array of LED's or a combination of flashlamps and LED's is used the electronic components of the printed circuit board program and control the duration and sequence of the on cycle in each of the sources of light.

The rear section of the trolling lure 102 is molded with a male threaded front 110. I prefer a solid rear section for added weight in the trolling lure, however if the lure is used with either a downrigger or outrigger this weight may not be desirable. In that case the rear section will be hollow. The line channel 106 continues through the rear section of the lure.

The source of light, the circuit board and the battery are placed in the front section of the lure. These are well protected within the body of the lure and the battery is replaceable. In order to make a more water tight seal an "O" ring gasket 120 or stopcock grease is placed between the two sections and then they are screwed together. The line is threaded through the line channel 106, and the skirt 108 attached. The fisherman will attach a hook wherever he prefers on the line most usually where it is concealed by the skirt.

The bubbler holes will create turbulence when the lure is pulled through the water. The light from the lure will bounce off the turbulence adding to the attraction.

In order to make the lure as small and light as possible the body of the casting lure 2 is made in one section 202. The source of light 111, the printed circuit board 112 containing various electronic components 114 and the compartment for the energy source 113 are all molded into the body of the casting lure. Again the electronic components on the circuit board are meant to be illustrative and are not meant to accurately portray the components on the printed circuit board. The options for the source of light and the circuit board are the same as for the trolling lure above, and the circuit board performs the same function in the casting lure as in the trolling lure. Again, the energy source is replaceable.

Cabochons 103 are molded into this body 202 as are attachments 204 for hooks 205 and a deflector 206 with a hole 207 for a line attachment. A replaceable energy source 121 such as a battery is placed in compartment 113 This source is held securely in place by using spring loaded sombrero fasteners 209. When the lure is used another spring loaded cap 208 is screwed into place. This cap presses on the sombrero fasteners in such a way that the pressure forces the sombrero fasteners to complete the circuit energizing the source of light.

I claim:
1. A light emitting fishing lure comprising:
 (a) a transparent lure body having an index of refraction greater than that of water and defining a lure cavity having an orifice communicating with the space outside said lure body, said lure body acting as a large diameter single fiber optic member, defining a relatively regular outside surface portion on said lure body;
 (b) a cap for closing said orifice;
 (c) engagement means adapted to mate with said cap, said engagement means being secured around said orifice to permit said orifice to be closed by said cap;
 (d) a battery configured and dimensioned to pass through said orifice;
 (e) circuit means adapted to receive said battery and provide a non-uniform pulsing electrical signal in response thereto; and
 (f) a light emitting device connected to receive said electrical signal, said lure body being optically coupled to said light emitting;
 (g) a collar containing channels for the passage of water such that the diameter of the entrance of the channel is greater than the diameter of the exit of the channel resulting in bubbles passing along the body of the light emitting lure; and
 (h) a plurality of refractive contours defined by the surface of said lure body and extending away from said relatively regular surface portion and having an index of refraction substantially the same as the index of refraction of said lure body and having outside surfaces shaped to increase the angle of incidence with respect to said outside surface for light conducted through said lure body.

2. The lure of claim 1, wherein said contours comprise approximately 30 percent to 50 percent of the surface area of said lure body, and said contours range in diameter from 20 percent to 70 percent of said lure body diameter to irregularly radiate the emitted light making a more noticeable and attractive bait.

3. The lure of claim 2, wherein said contours arranged in a non-uniform manner over said lure body to irregularly radiate the emitted light making a more noticeable and attractive bait.

4. The lure of claim 2 in which the rear section is fitted with a skirt.

5. The lure of claim 2 in which the energy source is replaceable.

6. The lure of claim 2 in which the body is faceted.

7. The lure of claim 2 in which the body contains molded in cabochon shapes.

8. A fishing lure as in claim 2 further comprising a deflector for achieving irregular movement of said lure, said deflector being secured to the outside surface of said lure.

9. A fishing lure as in claim 2 wherein said deflector is secured adjacent to a forward end of the lure body.

10. A fishing lure as in claim 2 further comprising support eye means for securing a line and hooks.

11. A light emitting fishing lure comprising:
 (a) a transparent body having an index of refraction greater than that of water, said body acting as a single large fiber optic having a plurality of output ports formed integrally therewith;
 (b) said body comprising approximately 50 percent to 70 percent smooth surface area and 30 percent to 50 percent output ports to irregularly radiate the emitted light;
 (c) said output ports ranging in diameter from 20 percent to 70 percent of the body diameter to irregularly radiate the emitted light;
 (d) said output ports being arranged in a non-uniform manner over the transparent body to irregularly radiate the emitted light;
 (e) said body comprising at least a first and a second section capable of being joined in a water tight manner;
 (f) said body containing a source of light, an energy source to activate the source of light during an on cycle and a printed circuit board with means programmed to control the source of energy and the duration of said on cycle of the source of light providing for an intermittent illumination through an irregularly radiating body making for a noticeable and attractive bait;

(g) the source of light being an LED, a plurality of LEDs, a strobe lamp, a plurality of strobe lamps, or any combination thereof; and (h) the first section of said body being fitted with a collar containing channels for the passage of water such that the diameter of the entrance of the channel is larger than the diameter of the exit of the channel resulting in an altered water flow along the body of the light emitting lure to act in combination with the illumination to make a more attractive bait.

12. The lure of claim 11 in which the rear section is fitted with a skirt.

13. The lure of claim 11 in which the energy source is replaceable.

14. The lure of claim 11 in which the body is faceted.

15. The lure of claim 11 in which the body contains molded in cabochon shapes.

* * * * *